United States Patent
Onufryk et al.

(10) Patent No.: US 8,588,228 B1
(45) Date of Patent: Nov. 19, 2013

(54) NONVOLATILE MEMORY CONTROLLER WITH HOST CONTROLLER INTERFACE FOR RETRIEVING AND DISPATCHING NONVOLATILE MEMORY COMMANDS IN A DISTRIBUTED MANNER

(75) Inventors: Peter Z. Onufryk, Flanders, NJ (US); Jayesh Patel, San Jose, CA (US); Ihab Jaser, San Jose, CA (US); Ganesh T. Seshan, Fremont, CA (US)

(73) Assignee: PMC-Sierra US, Inc., Sunnyvale, CA (US)

(*) Notice: Subject to any disclaimer, the term of this patent is extended or adjusted under 35 U.S.C. 154(b) by 115 days.

(21) Appl. No.: 13/052,008

(22) Filed: Mar. 18, 2011

Related U.S. Application Data

(60) Provisional application No. 61/374,242, filed on Aug. 16, 2010.

(51) Int. Cl.
 *H04L 12/28* (2006.01)
(52) U.S. Cl.
 USPC .......................................... 370/389; 710/316
(58) Field of Classification Search
 USPC ............ 370/389; 719/321; 711/157; 235/380
 See application file for complete search history.

(56) References Cited

U.S. PATENT DOCUMENTS

| | | | |
|---|---|---|---|
| 5,875,343 A | 2/1999 | Binford et al. | |
| 7,620,784 B2* | 11/2009 | Panabaker | 711/157 |
| 7,708,195 B2* | 5/2010 | Yoshida et al. | 235/380 |
| 8,244,946 B2 | 8/2012 | Gupta et al. | |
| 2008/0256280 A1 | 10/2008 | Ma | |
| 2008/0320214 A1 | 12/2008 | Ma et al. | |
| 2009/0077302 A1 | 3/2009 | Fukuda | |
| 2010/0185808 A1 | 7/2010 | Yu et al. | |
| 2010/0262979 A1* | 10/2010 | Borchers et al. | 719/321 |
| 2011/0161678 A1 | 6/2011 | Niwa | |

OTHER PUBLICATIONS

NVM Express, Revision 1.0; Intel Corporation; Mar. 1, 2011.
NVM Express, revision 1.0; Intel Corporation; pp. 103-106 and 110-114; Jul. 12, 2011.

* cited by examiner

*Primary Examiner* — Dang Ton
*Assistant Examiner* — Lionel Preval
(74) *Attorney, Agent, or Firm* — Kenneth Glass; Stanley J. Pawlik; Glass & Associates

(57) ABSTRACT

A nonvolatile memory controller includes a host controller interface, processors, a message networks and a data network. The host controller interface includes a command fetch module, command assembly buffers, and a command dispatch module. The command fetch module retrieves nonvolatile memory commands from a host processing unit. The command assembly buffers store the nonvolatile memory commands retrieved from the host processing unit. The command dispatch module generates request message packets including the nonvolatile memory commands. The message network routes the request message packets to the processors. The processors process the nonvolatile memory commands in the request message packets for controlling operation of the nonvolatile memory controller.

17 Claims, 11 Drawing Sheets

US 8,588,228 B1

NONVOLATILE MEMORY CONTROLLER WITH HOST CONTROLLER INTERFACE FOR RETRIEVING AND DISPATCHING NONVOLATILE MEMORY COMMANDS IN A DISTRIBUTED MANNER

CROSS-REFERENCE TO RELATED APPLICATION

This application claims benefit of U.S. provisional patent application Ser. No. 61/374,242 filed Aug. 16, 2010 and entitled "Non Volatile Memory Host Controller Interface Device," which is incorporated herein by reference in its entirety.

BACKGROUND

Nonvolatile Memory Express (NVMe) is a standard defining a register interface, command set, and feature set for high-performance Peripheral Component Interconnect Express (PCIe) based solid-state drives (SSDs). An NVMe interface includes a register interface defined by the NVMe standard and allows a host computer to communicate with a non-volatile memory subsystem such as a Flash storage device. Typically, the NVMe interface is implemented as a stand-alone Peripheral Component Interconnect (PCI) device.

In a typical computing system including an NVMe interface, a host computer provides nonvolatile memory commands to a non-volatile memory subsystem including the NVMe interface. In turn, the NVMe interface processes the nonvolatile memory commands to manage data in a non-volatile memory device of the non-volatile memory subsystem. Although the NVMe standard specifies a register set and a standard command set for designing an NVMe interface, the NVMe standard leaves other implementation details open to a designer of the non-volatile memory subsystem.

SUMMARY

In various embodiments, a nonvolatile memory controller includes a host controller interface, processors, a message network, and a data network. The host controller interface includes a command fetch module, command assembly buffers, and a command dispatch module. The command fetch module retrieves nonvolatile memory commands from a host processing unit. The command assembly buffers store the nonvolatile memory commands retrieved from the host processing unit. The command dispatch module identifies command assembly buffers storing nonvolatile memory commands and generates request message packets including the nonvolatile memory commands. In this way, the command dispatch module dispatches the nonvolatile memory commands. The message network routes the request message packets to the processors. In turn, the processors process the nonvolatile memory commands in the request message packets for controlling operation of the nonvolatile memory controller. For example, a processor may process a nonvolatile memory command to transfer data between the host processing unit and a nonvolatile storage device.

Because the command fetch module and the command dispatch module operate independently of each other, the host controller interface retrieves and dispatches nonvolatile memory commands quickly and efficiently in a distributed manner. Moreover, because the host controller interface includes multiple command assembly buffers, the host controller interface is capable of retrieving and dispatching multiple nonvolatile memory commands in parallel. As a result, the nonvolatile memory controller retrieves and dispatches nonvolatile memory commands more quickly than other nonvolatile memory controllers that do not retrieve and dispatch nonvolatile memory commands in a distributed manner.

A nonvolatile memory controller, in accordance with one embodiment, includes processors, a host controller interface, a message network, and a data network. The processors and the host controller interface are coupled to the message network. Additionally, the host controller interface is coupled to the data network. The host controller interface includes a command fetch module, command assembly buffers, and a command dispatch module. The command fetch module is coupled to the assembly buffers. The command dispatch module is coupled to the command assembly buffers and the message network. The command fetch module is configured to detect a nonvolatile memory command stored in a host processing unit, select a command assembly buffer, retrieve the nonvolatile memory command from the host processing unit, and write the nonvolatile memory command to the selected command assembly buffer. The command dispatch module is configured to determine the selected command assembly buffer contains the nonvolatile memory command, select a processor from the processors in the processor module, and generate a request message packet identifying the nonvolatile memory command and the selected processor. The message network is configured to route the request message packet to the selected processor. The selected processor is configured to process the nonvolatile memory command in the request message packet for transferring data between the host processing unit and a nonvolatile memory device through the data network.

In a further embodiment, the host controller interface includes message output queues coupled to the command dispatch module and the message network. In this embodiment, the command dispatch module is further configured to select a message output queue and write the request message packet to the selected message output queue. Moreover, the message network routes the request message packet from the selected message output queue to the selected processor.

A method, in accordance with one embodiment, includes detecting a nonvolatile memory command in a host processing unit by a host controller interface of a nonvolatile memory controller. Additionally, the method includes selecting a command assembly buffer from among command assembly buffers in the host controller interface, retrieving the nonvolatile memory command from the host processing unit by the host controller interface, and storing the nonvolatile memory command in the selected command assembly buffer. The method also includes determining the selected command assembly buffer contains the nonvolatile memory command and selecting a processor from among processors in the nonvolatile memory controller. Further, the method includes generating a request message packet identifying the nonvolatile memory command by the host controller interface. The method also includes selecting a message output queue from among message output queues in the host controller interface and storing the request message packet in the selected message output queue. Additionally, the method includes routing the request message packet through a message network of the nonvolatile memory controller to the selected processor. The method further includes processing the nonvolatile memory command in the request message packet for transferring data between the host processing unit and a nonvolatile memory device through a data network of the nonvolatile memory controller.

Because the method retrieves nonvolatile memory commands and stores the nonvolatile memory commands in command assembly buffers and dispatches the nonvolatile memory commands from the command assembly buffers, the method retrieves and dispatches nonvolatile memory commands more quickly than other methods that do not retrieve and dispatch nonvolatile memory commands in such a distributed manner.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a nonvolatile memory controller includes a host controller interface for retrieving nonvolatile memory commands from a host processing unit and processors for processing the nonvolatile memory commands. The host controller interface generates a request message packet including a nonvolatile memory command retrieved from the host processing unit, selects one of the processors, and provides the request message packet to the selected processor through a message network of the nonvolatile memory controller. The selected processor processes the nonvolatile memory command in the request message packet for controlling operation of the nonvolatile memory controller. Moreover, the selected processor processes nonvolatile memory commands in request message packets retrieved from the host processing unit to transfer data between the host processing unit and a nonvolatile memory device through a data network of the nonvolatile memory controller.

Figure 1:
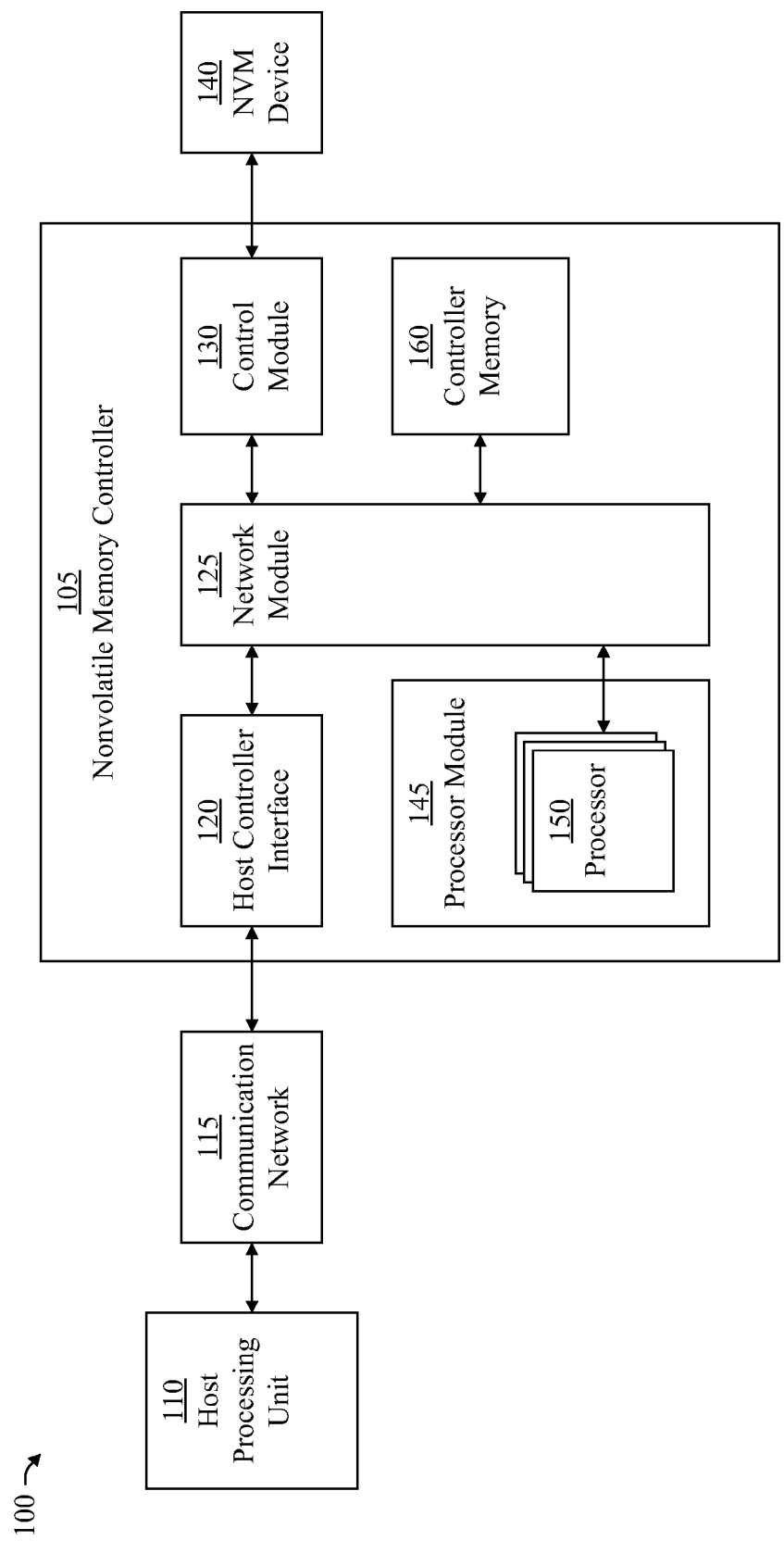
FIG. 1 is a block diagram of a computing environment, in accordance with an embodiment of the present invention.

FIG. 1 illustrates a computing environment 100, in accordance with an embodiment of the present invention. The computing environment 100 includes a host processing unit 110, a communication network 115, a nonvolatile memory controller 105, and a nonvolatile memory device 140. The communication network 115 is coupled (e.g., connected) to the host processing unit 110 and the nonvolatile memory controller 105. Additionally, the nonvolatile memory controller 105 is coupled (e.g., connected) to the nonvolatile memory device 140. In various embodiments, the nonvolatile memory device 140 is a Flash storage device and the nonvolatile memory controller 105 is a Flash controller.

The communication network 115 facilitates communication between the host processing unit 110 and the nonvolatile memory controller 105. For example, the communication network 115 may be a packet communication network, such as a Peripheral Component Interconnect Express (PCIe) network. The nonvolatile memory controller 105 manages data stored in the nonvolatile memory device 140 and communicates with the host processing unit 110 through the communication network 115 for transferring data between the host processing unit 110 and the nonvolatile memory device 140. In various embodiments, the nonvolatile memory controller 105 processes nonvolatile memory commands generated by the host processing unit 110 for controlling operation of the nonvolatile memory controller 105. In some embodiments, the host processing unit 110 generates Non-Volatile Memory Express (NVMe) commands from the host processing unit 110 and the nonvolatile memory controller 105 processes the NVMe commands to manage operation of the nonvolatile memory controller 105.

In various embodiments, the nonvolatile memory controller 105 includes a host controller interface 120, a network module 125, a control module 130, a processor module 145, and a controller memory 160. The network module 125 is coupled (e.g., connected) to the host controller interface 120, the control module 130, the processor module 145, and the controller memory 160. Additionally, the host controller interface 120 is coupled (e.g., connected) to the communication network 115, and the control module 130 is coupled (e.g., connected) to the nonvolatile memory device 140. Furthermore, the processor module 145 includes processors 150 coupled (e.g., connected) to the network module 125. In these embodiments, each of the host controller interface 120, the control module 130, the processors 150, and the controller memory 160 is a functional unit of the nonvolatile memory controller 105.

In various embodiments, each of the host controller interface 120, the control module 130, the processor module 145, and the controller memory 160 is source node or a destination node of the nonvolatile memory controller 105. In this way, each functional unit of the nonvolatile memory controller 105 may be a source node or a destination node. In some embodiments, one or more of the host controller interface 120, the control module 130, the processor module 145, and the controller memory 160 is both a source node and a destination node of the nonvolatile memory controller 105. In this way, a functional unit of the nonvolatile memory controller 105 may be both a source node and a destination node.

The host controller interface 120 facilitates communication between the communication network 115 and the functional units of the nonvolatile memory controller 105 through the network module 125. The control module 130 manages data in the nonvolatile memory device 140. For example, the control module 130 may read data from the nonvolatile memory device 140 and write data into the nonvolatile memory device 140.

The controller memory 160 stores data being transferred from the host processing unit 110 to the nonvolatile memory device 140. Additionally, the controller memory 160 stores data being transferred from the nonvolatile memory device 140 to the host processing unit 110. In this way, the controller memory 160 is an intermediate storage location for temporarily storing data being transferred between the host processing unit 110 and the nonvolatile memory device 140. In various embodiments, the controller memory 160 includes a random access memory (RAM), such as a static random access memory (SRAM) or a dynamic random access memory (DRAM).

In various embodiments, the host controller interface 120 retrieves a request packet including a nonvolatile memory command from the host processing unit 110 through the communication network 115, generates a request message packet including the nonvolatile memory command based on the request packet, and provides the request message packet to the network module 125. In turn, the network module 125 routes the request message packet to the processor module 145. The processor module 145 processes the nonvolatile memory command in the request message packet, generates a completion message packet including a completion status (e.g., a completion entry) based on the request message packet, and provides the completion message packet to the network module 125. The network module 125 routes the completion message packet to the host controller interface 120.

The host controller interface 120 generates a request packet including the completion status based on the completion message packet and transmits the request packet to the host processing unit 110 through the communication network 115. In turn, the host processing unit 110 stores the completion status of the request message packet received from the host controller interface 120 and processes the completion status to determine the status of processing the nonvolatile memory command (i.e., a processing status).

In various embodiments, a processor module 145 processes the nonvolatile memory command in a request message packet by generating additional request message packets, each of which includes a command. The processor 150 provides the request message packets to the network module 125. In turn, the network module 125 routes each of the request message packets received from the processor module 145 to a functional unit of the nonvolatile memory controller 105 identified in the request message packet. In this way, the processor 150 functions as a source node and the functional unit receiving the request message packet functions as a destination node.

The functional unit receiving a request message packet from the processor 150 through the network module 125 processes the command in the request message packet, generates a completion message packet including a completion status based on the request packet, and provides the completion message packet to the network module 125. The completion status of the completion message packet indicates a status of the command processed by the functional unit (i.e., a processing status). The network module 125 routes the completion message packet to the processor 150.

In various embodiments, the processor module 145 processes the nonvolatile memory command in the request message packet received from the host controller interface 120 by generating a request message packet including a data transfer command for transferring data between the host processing unit 110 and the controller memory 160, and generating another request message packet including a data transfer command for transferring data between the controller memory 160 and the nonvolatile memory device 140. In this way, the processor module 145 generates request message packets for transferring data in a piecemeal manner between the host processing unit 110 and the nonvolatile memory device 140 based on the request message packet including the nonvolatile memory command.

In some cases, each functional unit receiving a request message packet from the processor module 145 generates one or more request data packets based on the request message packet. Each of the request data packets is a request for transferring data between functional units of the nonvolatile memory controller 105 through the network module 125 or transferring data between the host processing unit 110 and the host controller interface 120. For example, the control module 130 may generate request data packets and provide the request data packets to the network module 125 for routing to the controller memory 160. In this example, the controller memory 160 generates completion packets including data stored in the controller memory 160 and provides the completion packets to the network module 125 for routing to the control module 130.

In various embodiments, the nonvolatile memory controller 105 is implemented in an integrated circuit of an integrated circuit device which may include an integrated circuit package containing the integrated circuit. In some embodiments, the nonvolatile memory controller 105 is implemented in a single integrated circuit die. In other embodiments, the nonvolatile memory controller 105 is implemented in more than one integrated circuit die of an integrated circuit device which may include a multichip package containing the integrated circuit die.

Figure 2:
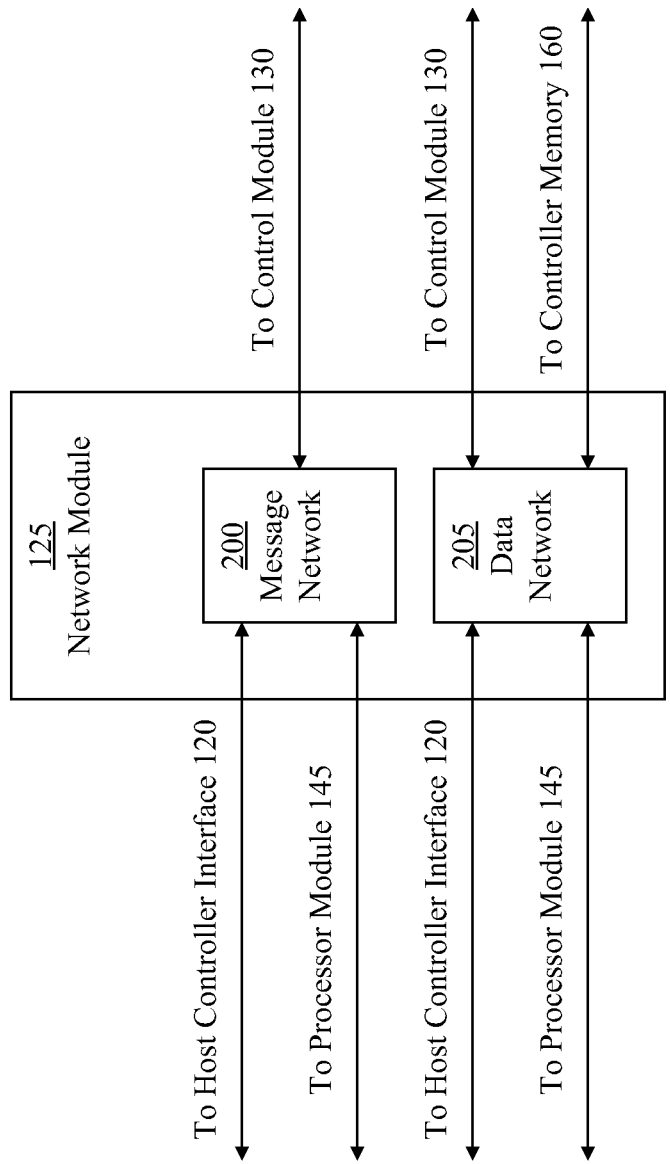
FIG. 2 is a block diagram of a network module, in accordance with an embodiment of the present invention.

FIG. 2 illustrates the network module 125, in accordance with an embodiment of the present invention. The network module 125 includes a message network 200 and a data network 205. Each of the message network 200 and the data network 205 is coupled (e.g., connected) to the host controller interface 120, the control module 130, and the processor module 145. Additionally, the data network 205 is coupled to the controller memory 160.

The message network 200 routes message packets, such as request message packets and completion message packets, between functional units of the nonvolatile memory controller 105. In various embodiments, the message network 200 routes message packets among functional units of the nonvolatile memory controller 105 by using an inter-processor communication (IPC) protocol.

The data network 205 routes data packets, such as data request packets and data completion packets, between functional units of the nonvolatile memory controller 105. In various embodiments, the data network 205 routes data packets among functional units of the nonvolatile memory controller 105 by using an inter-processor communication (IPC) protocol.

In various embodiments, the nonvolatile memory controller 105 routes message packets exclusively through the message network 200. As a result, nonvolatile memory commands pass through the message network 200 but do not pass through the data network 205. Because nonvolatile memory commands do not pass through the data network 205, the nonvolatile memory commands do not consume bandwidth of the data network 205. As a result, throughput of the data network 205 is improved over other nonvolatile memory controllers that pass nonvolatile memory commands and data through a common data path.

Figure 3:
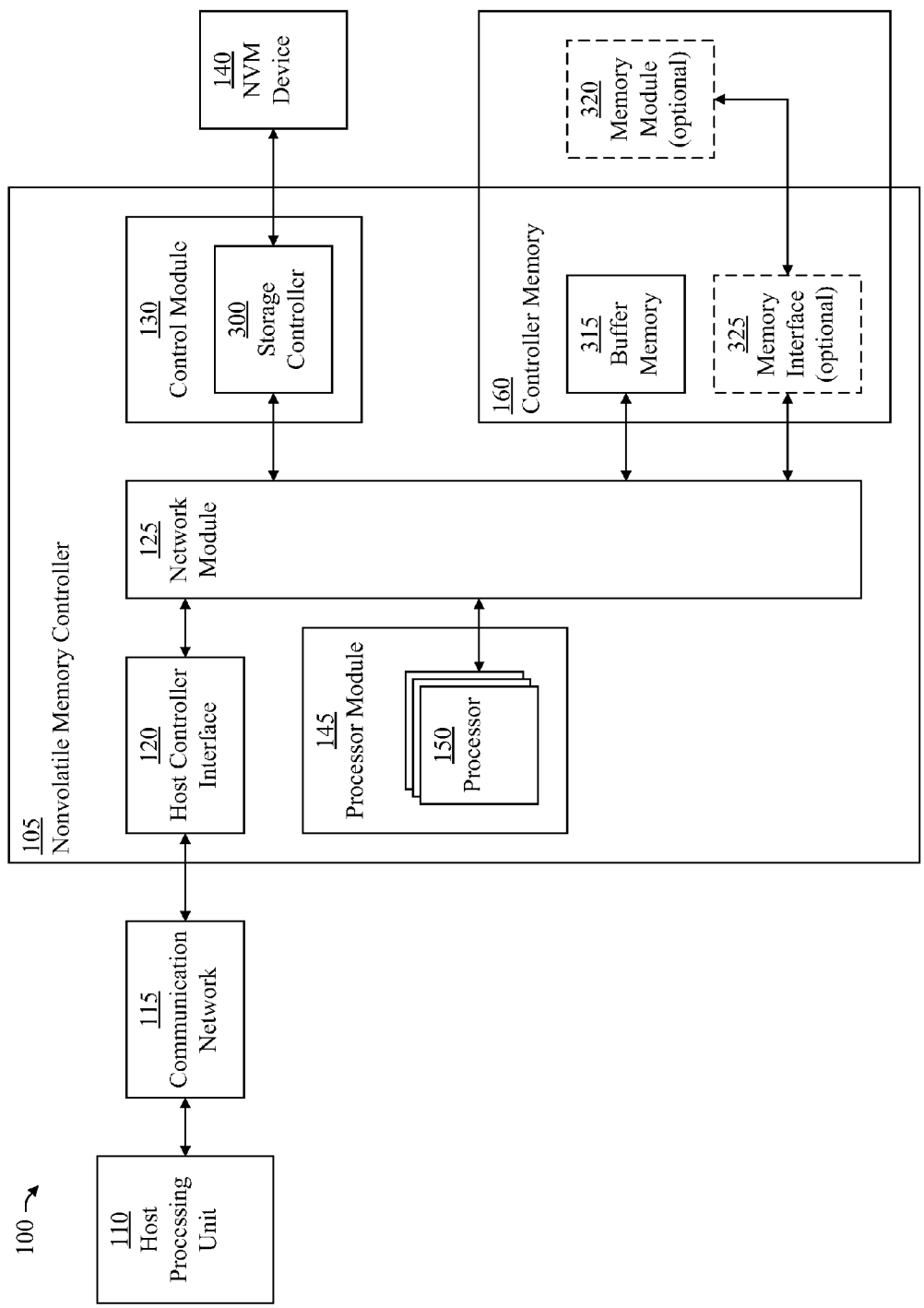
FIG. 3 is a block diagram of a computing environment, in accordance with an embodiment of the present invention.

FIG. 3 illustrates a computing environment 100, in accordance with an embodiment of the present invention. In this embodiment, the control module 130 includes a storage controller 300. The storage controller 300 is coupled (e.g., connected) to the network module 125 and the nonvolatile memory device 140. Furthermore, the controller memory 160 includes a buffer memory 315 coupled to the network module 125. Each of the storage controller 300 and the buffer memory 315 is a functional unit of the nonvolatile memory controller 105.

The storage controller 300 manages data in the nonvolatile memory device 140. For example, the storage controller 300 may read data from the nonvolatile memory device 140 and write data into the nonvolatile memory device 140. The buffer memory 315 stores data being transferred from the host processing unit 110 to the nonvolatile memory device 140. Additionally, the buffer memory 315 stores data being transferred from the nonvolatile memory device 140 to the host processing unit 110. In this way, the buffer memory 315 is a temporary storage location for data being transferred between the host processing unit 110 and the nonvolatile memory device 140. In various embodiments, the buffer memory 315 includes a random access memory (RAM), such as a static random access memory (SRAM).

In some embodiments, the controller memory 160 includes a memory interface 325 coupled (e.g., connected) to a memory module 320 external of the nonvolatile memory controller 105. For example, the nonvolatile memory controller 105 may be implemented in an integrated circuit and the memory module 320 may be implemented in another integrated circuit. In these embodiments, the controller memory 160 includes the memory interface 325 and the memory module 320 in addition to the buffer memory 315. Moreover, the memory interface 325 is a functional unit of the nonvolatile memory controller 105.

The memory interface 325 facilitates communication between the network module 125 and the memory module 320. The memory module 320 stores data being transferred from the host processing unit 110 to the nonvolatile memory device 140. Additionally, the memory module 320 stores data being transferred from the nonvolatile memory device 140 to the host processing unit 110. In this way, the memory module 320 is a temporary storage location for data being transferred between the host processing unit 110 and the nonvolatile memory device 140. In various embodiments, the memory module 320 includes a random access memory (RAM), such as a dynamic random access memory (DRAM).

In various embodiments, a processor 150 receives a request message packet including a nonvolatile memory command from the host controller interface 120 through the network module 125 and processes the nonvolatile memory command in the request message packet by generating additional request message packets, each of which includes a command. The processor 150 provides the request message packets generated by the processor 150 to the network module 125. In turn, the network module 125 routes each of the request message packets to a functional unit of the nonvolatile memory controller 105. Each of the functional units receiving a request message packet from the processor 150 through the network module 125 processes the command in the request message packet, generates a completion message packet based on the request message packet, and provides the completion message packet to the network module 125. The completion message packet includes a completion status indicating a processing status of the request message packet processed by the functional unit. The network module 125 routes the completion message packet to the processor 150.

In various embodiments, the processor 150 processes the nonvolatile memory command in the request message packet received from the host controller interface 120 by generating a request message packet including a data transfer command for transferring data between the host processing unit 110 and the controller memory 160, and generating another request message packet including a data transfer command (e.g., a Flash command) for transferring data between the controller memory 160 and the nonvolatile memory device 140. For example, the processor 150 may generate a request message packet including a Flash read command and a destination identifier that identifies the storage controller 300. In this example, the processor 150 provides the request message packet to the network module 125, and the network module 125 routes the request message packet to the storage controller 300 based on the destination identifier in a request message packet of the request message packet received from the processor 150. In turn, the storage controller 300 transfers the data from the nonvolatile memory device 140 to the buffer memory 315 based on the Flash read command in the request message packet received from the processor 150.

Further in this example, the processor 150 generates a request message packet including a data transfer command and a destination identifier that identifies the host controller interface 120. In this example, the processor 150 provides the request message packet to the network module 125, and the network module 125 routes the request message packet to the host controller interface 120 based on the destination identifier. In turn, the host controller interface 120 transfers the data from the buffer memory 315 to the host processing unit 110 based on the data transfer command in the request message packet received from the processor 150.

As another example, the processor 150 may generate a request message packet including a data transfer command and a destination identifier that identifies the host controller interface 120. In this example, the processor 150 provides the request message packet to the network module 125, and the network module 125 routes the request message packet to the host controller interface 120 based on the destination identifier. In turn, the host controller interface 120 transfers the data from the host processing unit 110 to the buffer memory 315 based on the data transfer command in the request message packet received from the processor 150.

Further in this example, the processor 150 generates a request message packet including a Flash write command and a destination identifier that identifies the storage controller 300. In this example, the processor 150 provides the request message packet to the network module 125, and the network module 125 routes the request message packet to the storage controller 300 based on the destination identifier in the request message packet. In turn, the storage controller 300 transfers the data from the buffer memory 315 to the nonvolatile memory device 140 based on the Flash write command in the request message packet received from the processor 150.

Figure 4:
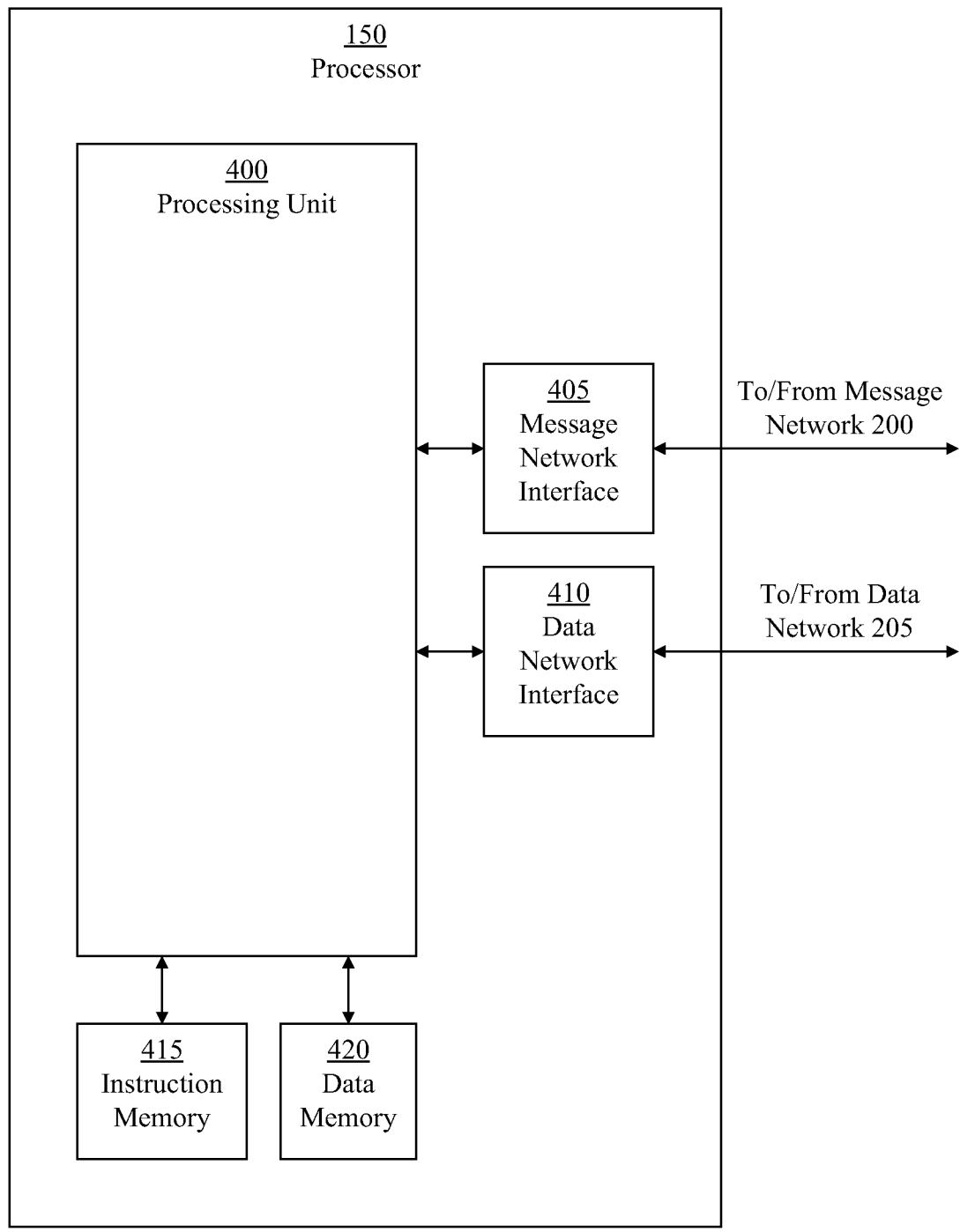
FIG. 4 is a block diagram of a processor, in accordance with an embodiment of the present invention.

FIG. 4 illustrates the processor 150, in accordance with an embodiment of the present invention. The processor 150 includes a processing unit 400, a message network interface 405, a data network interface 410, an instruction memory 415, and a data memory 420. The processing unit 400 is coupled (e.g., connected) to the message network interface 405, the data network interface 410, the instruction memory 415, and the data memory 420.

The message network interface 405 facilitates communication of message packets between the processing unit 400 and the message network 200. The data network interface 410 facilitates communication of data between the processing unit 400 and the data network 205.

The instruction memory 415 stores computing instructions for the processing unit 400. The data memory 420 stores data for the processing unit 400. In various embodiments, the processing unit 400 receives a request message packet including a nonvolatile memory command from the host controller interface 120 through the message network interface 405 and writes data into the data memory 420 based on the nonvolatile memory command in the request message packet. For example, the processing unit 400 may write a nonvolatile memory command of the request message packet into the data memory 420. As another example, the processing unit 400 may write data contained in the request message packet into the data memory 420 based on the nonvolatile memory command.

Additionally, the processing unit 400 reads the data from the data memory 420 and provides the data to the data network 205 through the data network interface 410 for routing to the buffer memory 315. In this way, the processing unit 400 transfers the data received from the host controller interface 120 in the request message packet to the buffer memory 315. Alternatively, the processing unit 400 reads the data from the data memory 420 and provides the data to the data network 205 through the data network interface 410 for routing to the memory interface 325. In turn, the memory interface 325 writes the data into the memory module 320. In this way, the processing unit 400 transfers the data received from the host controller interface 120 in the request message packet to the memory module 320.

In various embodiments, the processors 150 in the processor module 145 function as a pool of processors, a pipeline of processors (i.e., a processor pipeline), or some combination thereof. In some embodiments, one of the processors 150 in the processor module 145 is a control processor. In these embodiments, the control processor boots the nonvolatile memory controller 105 and performs overall control and management functions in the nonvolatile memory controller 105. For example, the control processor may generate interrupt requests and process interrupt requests. In some embodiments, the processing unit 400 of the processor 150 implements a Tensilica LX2 32-bit instruction set developed by the Tensilica Corporation of Santa Clara, Calif.

Figure 5:
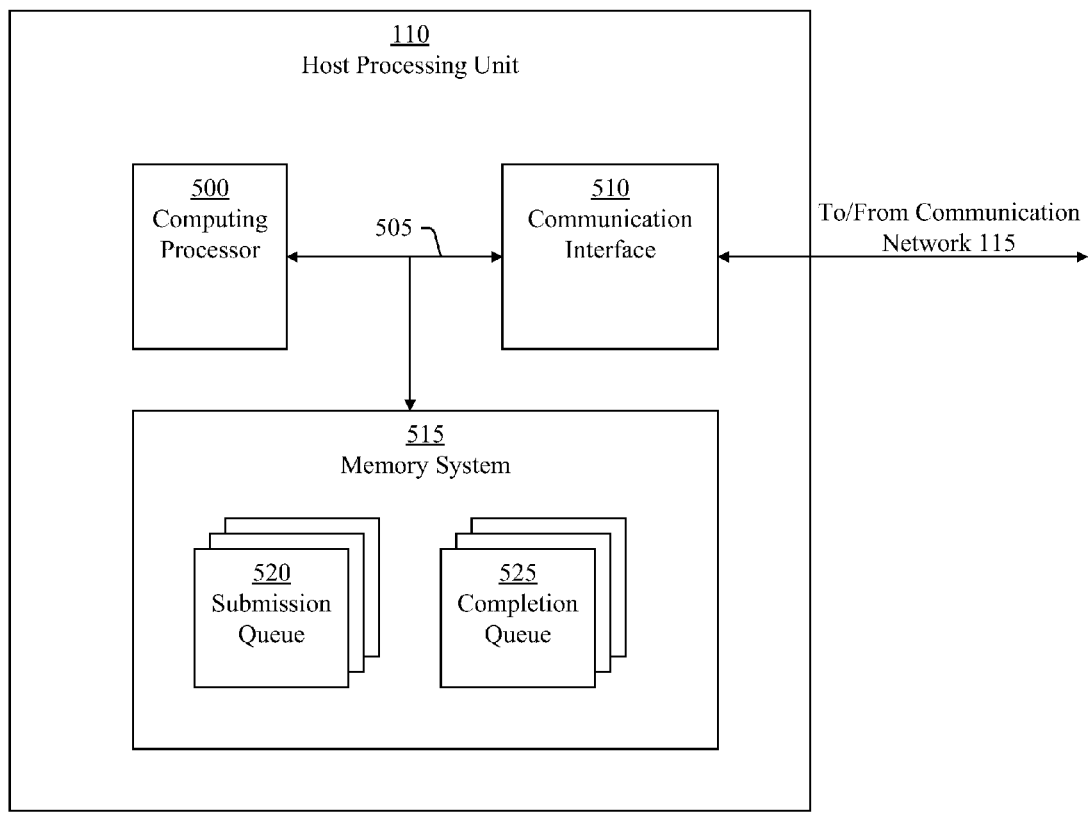
FIG. 5 is a block diagram of a host processing unit, in accordance with an embodiment of the present invention.

FIG. 5 illustrates the host processing unit 110, in accordance with an embodiment of the present invention. The host processing unit 110 includes a computing processor 500, a communication interface 510, and a memory system 515 coupled (e.g., connected) to each other through a computer bus 505. Moreover, the memory system 515 includes submission queues 520 and completion queues 525. The submission queues 520 store nonvolatile memory commands for controlling operation of the nonvolatile memory controller 105. The completion queues 525 store completion statuses corresponding to nonvolatile memory commands stored in the submission queues 520. In some embodiments, each of the completion queues 525 may be associated with one or more submission queues 520.

In various embodiments, the computing processor 500 generates nonvolatile memory commands for controlling the nonvolatile memory controller 105 and writes the nonvolatile memory commands into the submission queues 520. The nonvolatile memory controller 105 obtains the nonvolatile memory commands stored in the submission queues 520 and processes the nonvolatile memory commands to manage operation of the nonvolatile memory controller 105, as is described more fully herein. Further, the nonvolatile memory controller 105 generates completion statuses corresponding to the nonvolatile memory commands stored in the submission queues 520 and provides the completion statuses to the host processing unit 110 for storage in the completion queues 525. In this way, the nonvolatile memory controller 105 writes the completion statuses to the completion queues 525 in the host processing unit 110.

Figure 6:
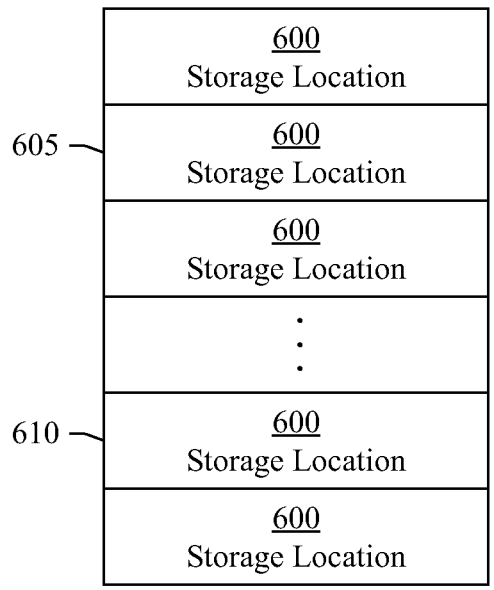
FIG. 6 is a block diagram of a submission queue, in accordance with an embodiment of the present invention.

FIG. 6 illustrates the submission queue 520, in accordance with an embodiment of the present invention. The submission queue 520 includes storage locations 600 for storing nonvolatile memory commands. In various embodiments, the submission queue 520 is a circular queue and includes a head 605 and a tail 610. For example, the submission queue 520 may include storage locations 600 of a PCIe memory in the memory system 515.

In operation, the computing processor 500 writes a nonvolatile memory command for controlling operation of the nonvolatile memory controller 105 to a storage location 600 at the tail 610 of the submission queue 520. Further, the computing processor 500 generates a write request packet including a tail pointer identifying the tail 610 of the submission queue 520. The host processing unit 110 transmits the write request packet to the nonvolatile memory controller 105 through the communication network 115. In this way, the host processing unit 110 writes the tail pointer to the nonvolatile memory controller 105 and updates a tail pointer stored in the nonvolatile memory controller 105 which identifies the tail 610 of the submission queue 520.

The nonvolatile memory controller 105 determines the submission queue 520 contains at least one nonvolatile memory command based on the tail pointer stored in the nonvolatile memory controller 105 and based on a head pointer stored in the nonvolatile memory controller 105 that identifies the head 605 of the submission queue 520 stored in the host processing unit 110. Further, the nonvolatile memory controller 105 retrieves one or more nonvolatile memory commands from storage locations 600 starting at the tail 610 of the submission queue 520 and processes the nonvolatile memory commands, as is described more fully herein.

In various embodiments, the nonvolatile memory controller 105 initializes the head pointer stored in the nonvolatile memory controller 105 for identifying the head of the submission queue 520 to the tail pointer of the submission queue 520 received from the host processing unit 110. Further, the nonvolatile memory controller 105 updates the head pointer based on nonvolatile memory commands retrieved from the host processing unit 110, as is described more fully herein.

Figure 7:
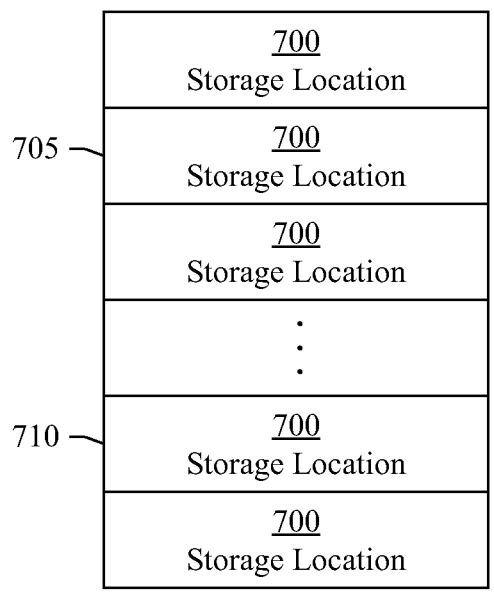
FIG. 7 is a block diagram of a completion queue, in accordance with an embodiment of the present invention.

FIG. 7 illustrates the completion queue 525, in accordance with an embodiment of the present invention. The completion queue 525 includes storage locations 700 for storing completion statuses. In various embodiments, the completion queue 525 is a circular queue and includes a head 705 and a tail 710. For example, the completion queue 525 may include storage locations 700 of a PCIe memory in the memory system 515.

In operation, the host processing unit 110 receives a request packet including a completion status from the host controller interface 120 through the communication network 115. The computing processor 500 writes the completion status into the storage location 700 at the tail 710 of the completion queue 525. Additionally, the host processing unit 110 reads completion statuses from storage locations 700 starting at the head 705 of the completion queue 525 to determine the status of the nonvolatile commands associated with the completion statuses that have been processed by the nonvolatile memory controller 105. Further, the computing processor 500 provides a head pointer of the completion queue 525 to the nonvolatile memory controller 105, which identifies the next storage location 700 in the completion queue 525 for storing the next completion status to be processed by the computing processor 500. In this way, the head pointer identifies the new head 705 of the completion queue 525.

In some embodiments, the computing processor 500 generates a write request packet including a head pointer identifying the next storage location 700 at the head 705 of the completion queue 525 storing the next completion status. The host processing unit 110 transmits the write request packet to the nonvolatile memory controller 105 through the communication network 115. In this way, the host processing unit 110 writes the head pointer to the nonvolatile memory controller 105 and updates a head pointer stored in the nonvolatile memory controller 105 which also identifies the head 705 of the completion queue 525.

Figure 8:
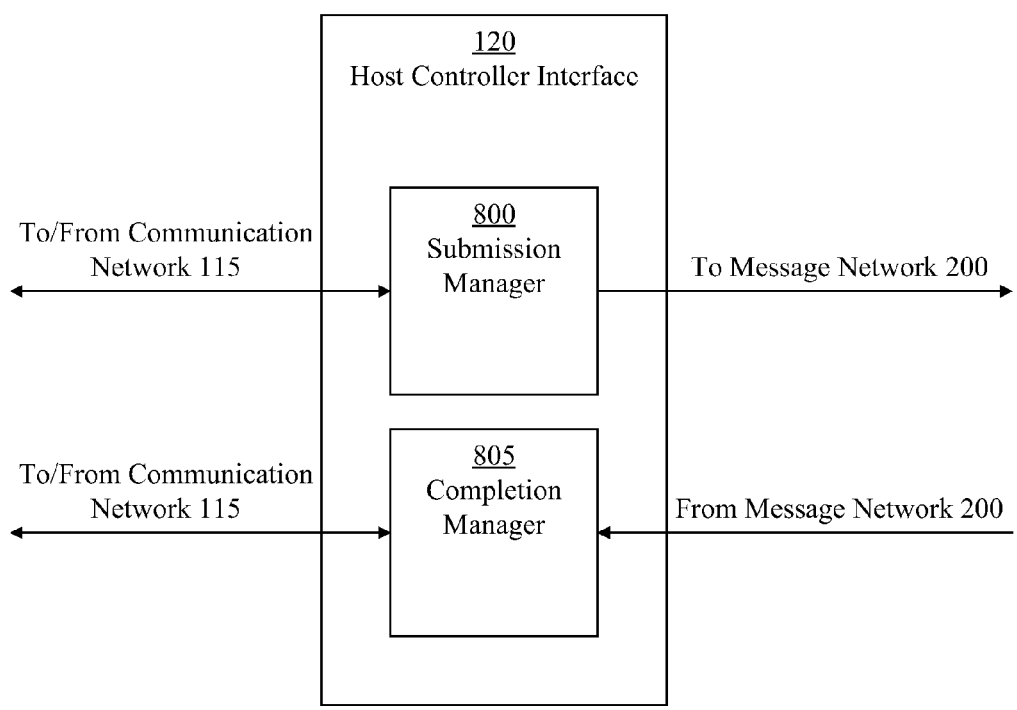
FIG. 8 is a block diagram of a host controller interface, in accordance with an embodiment of the present invention.

FIG. 8 illustrates the host controller interface 120, in accordance with an embodiment of the present invention. The host controller interface 120 includes a submission manager 800 and a completion manager 805. The submission manager 800 and the completion manager 805 are each coupled (e.g., connected) to the communication network 115 and the message network 200.

The submission manager 800 retrieves nonvolatile memory commands stored in the submission queues 520 of the memory system 515 in the host processing unit 110, generates request message packets based on the nonvolatile memory commands, and provides the request message packets to the message network 200 for routing to processors 150 of the nonvolatile memory controller 105. In various embodiments, the submission manager 800 retrieves a nonvolatile memory command stored in the memory system 515 of the host processing unit 110 by generating a request packet (e.g., a host memory read request packet), transmitting the request packet to the host processing unit 110 through the communication network 115, and receiving a completion packet containing the nonvolatile memory command from the host processing unit 110 through the communication network 115.

In some embodiments, the submission manager 800 retrieves nonvolatile memory commands stored in the submission queues 520 of the memory system 515 in the host processing unit 110 by retrieving the nonvolatile memory commands in parallel. In this way, the submission manager 800 retrieves the nonvolatile memory commands from the submission queues 520 substantially simultaneously. Moreover, the submission manager 800 may retrieve the nonvolatile memory commands from the same submission queue 520 or from different submission queues 520.

The completion manager 805 receives completion message packets from processors 150 of the nonvolatile memory controller 105 through the message network 200, generates write request packets (e.g., memory write request packets) based on the completion message packets, and transmits the write request packets to the host processing unit 110 through the communication network 115. Moreover, the completion message packets each include a completion status associated with a nonvolatile memory command processed by a processor 150. The host processing unit 110 processes the write request packets including the completion statuses received from the completion manager 805 by storing the completion statuses into completion queues 525 of the host processing unit 110.

In some embodiments, the completion status indicates whether processing of the nonvolatile memory command by the nonvolatile memory controller 105 was a success or a failure. In these embodiments, the host controller interface 120 may perform additional operations based on the completion status in the completion message packet. For example, if the completion status indicates a failure then the host controller interface 120 may perform error recovery operations based on the completion message packet.

Figure 9:
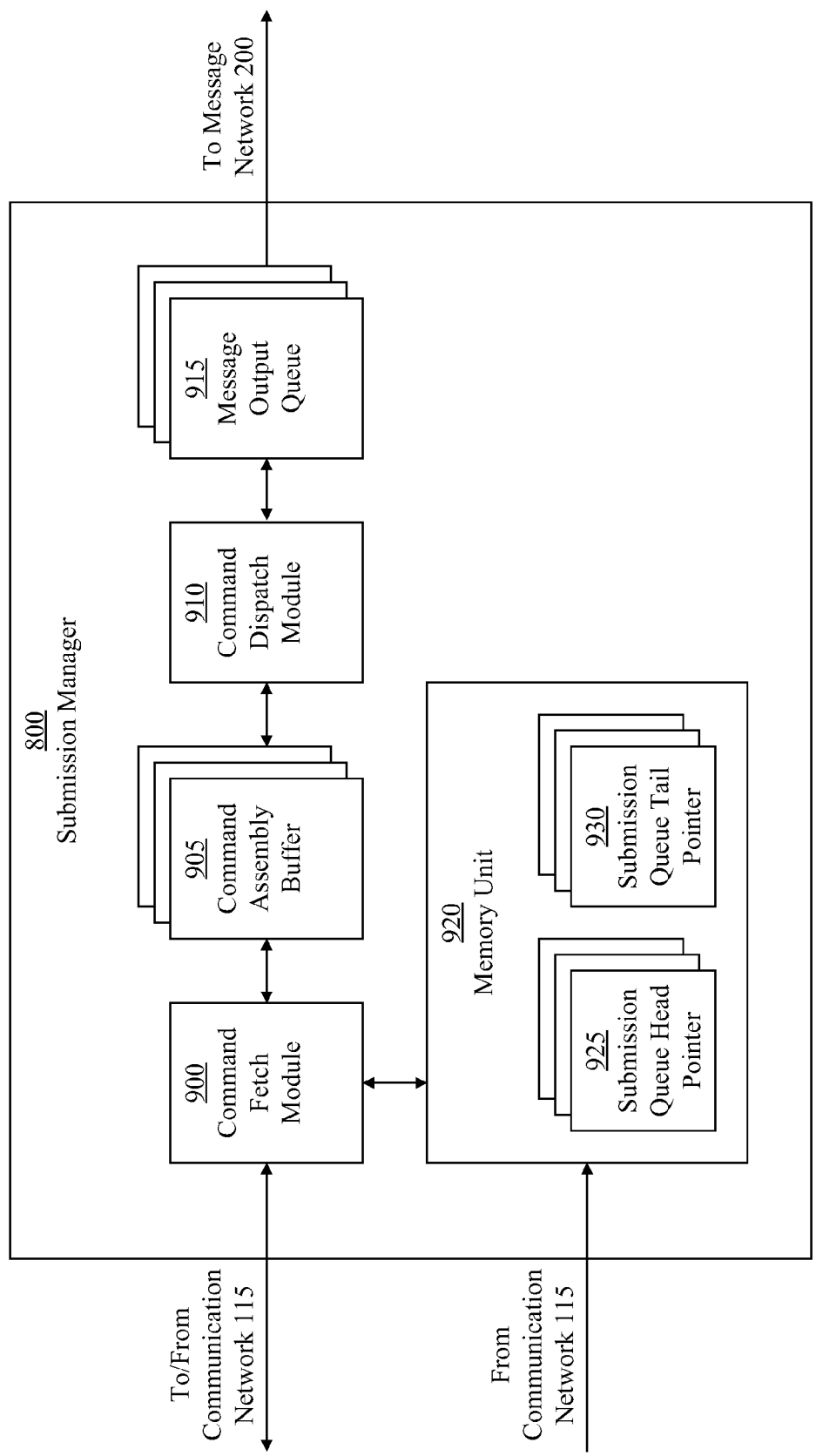
FIG. 9 is a block diagram of a submission manager, in accordance with an embodiment of the present invention.

FIG. 9 illustrates the submission manager 800, in accordance with an embodiment of the present invention. The submission manager 800 includes a command fetch module 900, command assembly buffers 905, a command dispatch module 910, message output queues 915, and a memory unit 920. The command fetch module 900 is coupled (e.g., connected) to the communication network 115, the command assembly buffers 905, and the memory unit 920. Additionally, the memory unit 920 is coupled (e.g., connected) to the communication network 115. The command dispatch module 910 is coupled (e.g., connected) to the command assembly buffers 905 and the message output queues 915. Further, each of the message output queues 915 is coupled (e.g., connected) to the message network 200.

The memory unit 920 stores submission queue head pointers 925 corresponding to the submission queues 520 stored in the memory system 515 of the host processing unit 110. The memory unit 920 also stores submission queue tail pointers 930 corresponding to the submission queues 520.

In various embodiments, the host processing unit 110 maintains (e.g., updates) the submission queue tail pointers 930 so that each of the submission queue tail pointers 930 identifies the storage location 600 at the tail 610 of the corresponding submission queue 520. In these embodiments, the command fetch module 900 maintains (e.g., updates) the submission queue head pointers 925 so that each of the submission queue head pointers 925 identifies the storage location 600 at the head 605 of the corresponding submission queue 520. The command fetch module 900 determines whether a submission queue 520 contains a nonvolatile memory command based on both the submission queue head pointer 925 and the submission queue tail pointer 930 of the submission queue 520.

For example, the command fetch module 900 may determine that the submission queue 520 contains at least one nonvolatile memory command if the submission queue head pointer 925 and the submission queue tail pointer 930 of the submission queue 520 identify different storage locations 600 in the submission queue 520. Further in this example, the command fetch module 900 determines the submission queue 520 does not contain any nonvolatile memory command (i.e., the submission queue 520 is empty) if the submission queue head pointer 925 and the submission queue tail pointer 930 of the submission queue 520 identify the same storage location 600 in the submission queue 520.

In operation, the command fetch module 900 monitors the submission queue head pointers 925 and the submission queue tail pointers 930. If the command fetch module 900 identifies a submission queue 520 storing at least one nonvolatile memory command, the command fetch module 900 generates a read request packet including an identifier identifying a storage location 600 in the submission queue 520 and transmits the read request packet to the host processing unit 110 through the communication network 115. The host processing unit 110 reads the nonvolatile memory command from the storage location 600 of the submission queue 520 based on the identifier of the read request packet, generates a completion packet including the nonvolatile memory command, and transmits the completion packet to the command fetch module 900 through the communication network 115.

The command fetch module 900 selects a command assembly buffer 905 and writes the nonvolatile memory command contained in the completion packet to the selected command assembly buffer 905. Additionally, the command fetch module 900 updates the submission queue head pointer 925 of the submission queue 520 containing the nonvolatile memory command to indicate that the host controller interface 120 retrieved the nonvolatile memory command from the submission queue 520. For example, the command fetch module 900 may update (e.g., increment) the submission queue head pointer 925 of the submission queue 520 to point to the storage location 600 of the submission queue 520 containing the next nonvolatile memory command to be retrieved by the host controller interface 120.

The command dispatch module 910 monitors the command assembly buffers 905 and identifies the command assembly buffer 905 storing the nonvolatile memory command. In this way, the command dispatch module 910 determines the command assembly buffer 905 contains the nonvolatile memory command. Additionally, the command dispatch module 910 selects a processor 150 of the nonvolatile memory controller 105 and generates a request message packet identifying the nonvolatile memory command and the processor 150. For example, the request message packet may include the nonvolatile memory command and an identifier of the processor 150. Further, the command dispatch module 910 selects a message output queue 915 and writes the request message packet into the selected message output queue 915. In this way, the command dispatch module 910 transfers the content of the command assembly buffer 905 to the selected message output queue 915. In turn, the message output queue 915 provides the request message packet to the message network 200 for routing to the processor 150 identified by the identifier in the request message packet.

In some embodiments, the submission manager 800 stores a message including the nonvolatile memory command in the controller memory 160. For example, the submission manager 800 may generate a data request packet including the message and provide the data request packet to the data network 205 for routing to the controller memory 160. In turn, the controller memory 160 stores the message contained in the data request packet. In these embodiments, the request message packet routed to the processor 150 includes a pointer identifying the message stored in the controller memory 160. In this way, the request message packet identifies the nonvolatile memory command in the message stored in the controller memory 160.

In various embodiments, the command fetch module 900 and the command dispatch module 910 operate independently of each other. For instance, the command fetch module 900 need not communicate with the command dispatch module 910 to determine whether a command assembly buffer 905 is available for storing a nonvolatile memory command. Moreover, the command dispatch module 910 need not communicate with the command fetch module 900 to determine whether a command assembly buffer 905 contains a nonvolatile memory command. In this way, the host controller interface 120 retrieves and dispatches nonvolatile memory commands quickly and efficiently in a distributed manner.

Moreover, because the host controller interface 120 includes multiple command assembly buffers 905, the host controller interface 120 is capable of retrieving multiple nonvolatile memory commands from the host processing unit 105 in parallel and storing the nonvolatile memory commands into the command assembly buffers 905 in parallel. In this way, the nonvolatile memory controller 105 generates request message packets including nonvolatile memory commands quickly and efficiently.

Figure 10:
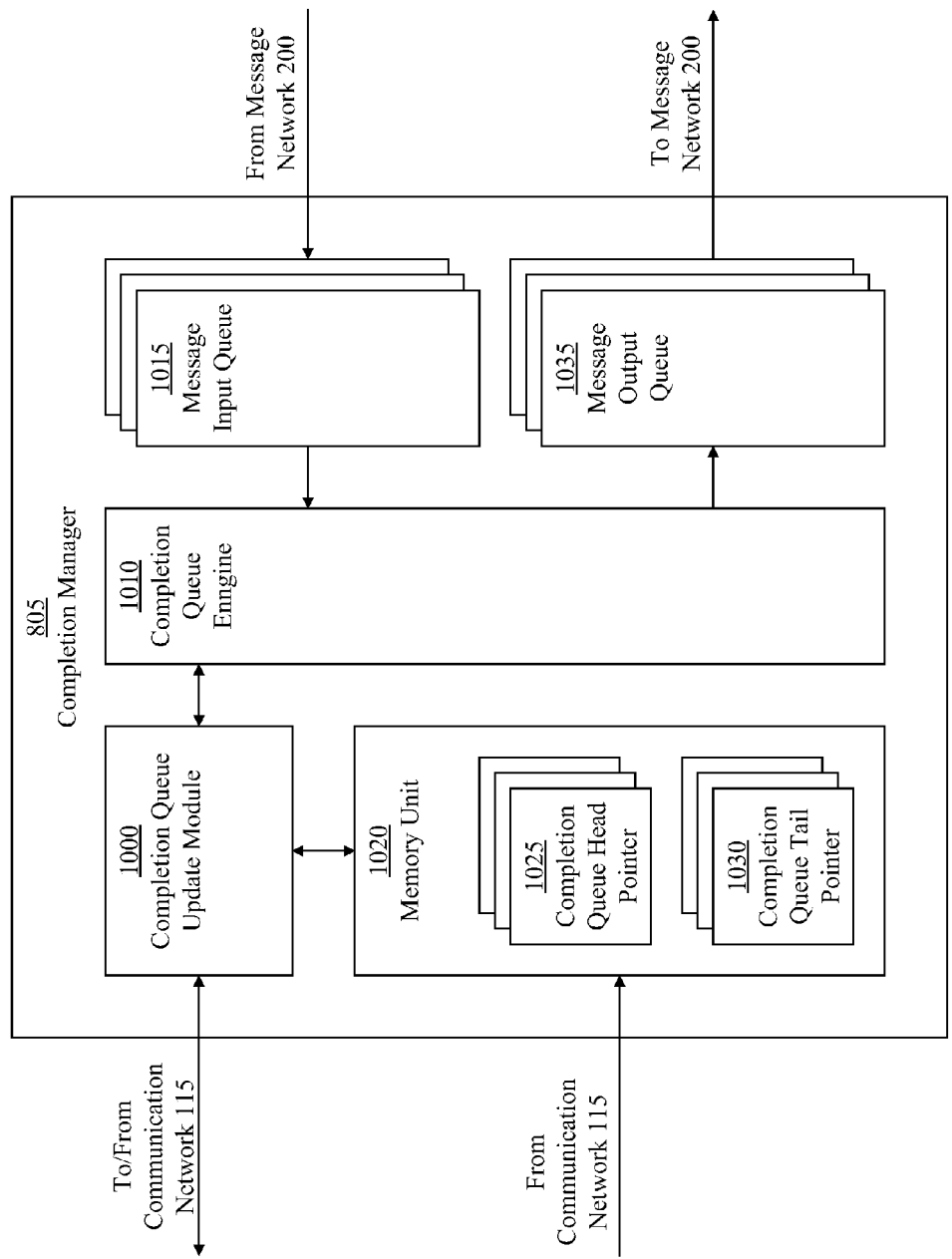
FIG. 10 is a block diagram of a completion manager, in accordance with an embodiment of the present invention.

FIG. 10 illustrates the completion manager 805, in accordance with an embodiment of the present invention. The completion manager 805 includes a completion queue update module 1000, a completion queue engine 1010, message input queues 1015, a memory unit 1020, and message output queues 1035. The completion queue update module 1000 is coupled (e.g., connected) to the communication network 115, the memory unit 1020, and the completion queue engine 1010. Additionally, the memory unit 1020 is coupled (e.g., connected) to the communication network 115. Each of the message input queues 1015 and each of the message output queues 1035 is coupled (e.g., connected) to the completion queue engine 1010 and the message network 200.

The memory unit 1020 stores completion queue head pointers 1025 corresponding to the completion queues 525 stored in the memory system 515 of the host processing unit 110. The memory unit 1020 also includes completion queue tail pointers 1030 corresponding to the completion queues 525.

In various embodiments, the host processing unit 110 maintains (e.g., updates) the completion queue head pointers 1025 so that each of the completion queue head pointers 1025 identifies the storage location 700 at the head 705 of the corresponding completion queue 525. In these embodiments, the completion queue update module 1000 maintains (e.g., updates) the completion queue tail pointers 1030 so that each of the completion queue tail pointers 1030 identifies the storage location 700 at the tail 710 of the corresponding completion queue 525.

In operation, a message input queue 1015 receives a completion message packet from a processor 150 of the nonvolatile memory controller 105 through the message network 200 and stores the completion message packet. The completion message packet is associated with a request message packet including a nonvolatile memory command processed by the processor 150. Moreover, the completion message packet includes a completion status indicating a processing status of the nonvolatile memory command in the request message packet. The completion queue engine 1010 monitors the message input queues 1015, identifies the message input queue 1015 storing the completion message packet, reads the completion message packet from the message input queue 1015 storing the completion message packet, and provides the completion message packet to the completion queue update module 1000.

The completion queue update module 1000 generates a write request packet (e.g., a memory write request packet) based on the completion message packet and transmits the write request packet to the host processing unit 110 through the communication network 115. The write request packet includes the completion status of the nonvolatile memory command and a completion queue tail pointer 1030 identifying a storage location 700 at the tail 710 of a completion queue 525 for storing the completion status. Additionally, the completion queue update module 1000 updates the completion queue tail pointer 1030 in the nonvolatile memory controller 105 to identify the storage location 700 in the completion queue 525 for storing the next completion status. In some embodiments, the completion queue update module 1000 inserts the current submission queue head pointer 925 of the submission queue 520 with which the completion message is associated into the write request packet. In this way, the completion queue update module 1000 provides an update of the submission queue head pointer 925 to the host processing unit 110.

The host processing unit 110 receives the write request packet and stores the completion status contained in the write request packet into the storage location 700 identified by a host memory address in the write request packet (e.g., a storage location at a tail 710 of the completion queue 525). The host processing unit 110 also updates a tail pointer of the completion queue 525 maintained in the host processing unit 110 (i.e., a local tail pointer) to identify the storage location 700 in the completion queue 525 for storing the next completion status.

Additionally, the host processing unit 110 monitors the completion queue 525, detects the completion status at the head 705 of the completion queue 525, and reads the completion status at the head 705 of the completion queue 525. In this way, the host processing unit 110 processes the completion status. Additionally, the host processing unit 110 updates a head pointer of the completion queue 525 maintained in the host processing unit 110 (i.e., a local head pointer) to identify the storage location 700 of the completion queue 525 containing the next completion status for processing. In this way, the host processing unit 110 frees the storage location 600 containing the processed completion status.

Further, the host processing unit 110 generates a write request packet including the head pointer of the completion queue 525 (i.e., a local head pointer) and transmits the request packet to the host controller interface 120 of the nonvolatile memory controller 105 through the communication network 115. In turn, the completion queue update module 1000 updates the completion queue head pointer 1025 of the completion queue 525 stored in the memory unit 1020 of the completion manager 805 with the head pointer (e.g., head pointer value) contained in the request packet. In this way, the host processing unit 110 updates the completion queue head pointer 1025 in the memory unit 1020 of the completion manager 805.

Additionally, the host processing unit 110 updates a head pointer of the submission queue 520 maintained in the host processing unit 110 (i.e., a local head pointer) based on the submission queue head pointer 925 contained in a completion status update in the request packet. For example, the host processing unit 110 may set the head pointer maintained in the host processing unit 110 to the submission queue head pointer 925. In this way, the host processing unit 110 frees storage locations 600 containing nonvolatile memory commands processed by the nonvolatile memory controller 105 from the submission queue 520.

The completion queue engine 1010 also generates a notification message packet based on the completion message packet read from the message input queue 1015 and writes the notification message packet into a message output queue 1035. The notification message packet includes a completion status indicating the processing status of the completion message packet read from the message input queue 1015. For example, the completion status of the notification message packet may indicate whether processing of the completion message packet by the completion manager 805 was a success or a failure. The message output queue 1035 provides the notification message packet to the message network 200. In turn, the message network 200 routes the notification message packet to the processor 150 of the nonvolatile memory controller 105 that generated the completion message packet read from the message input queue 1015.

Figure 11:
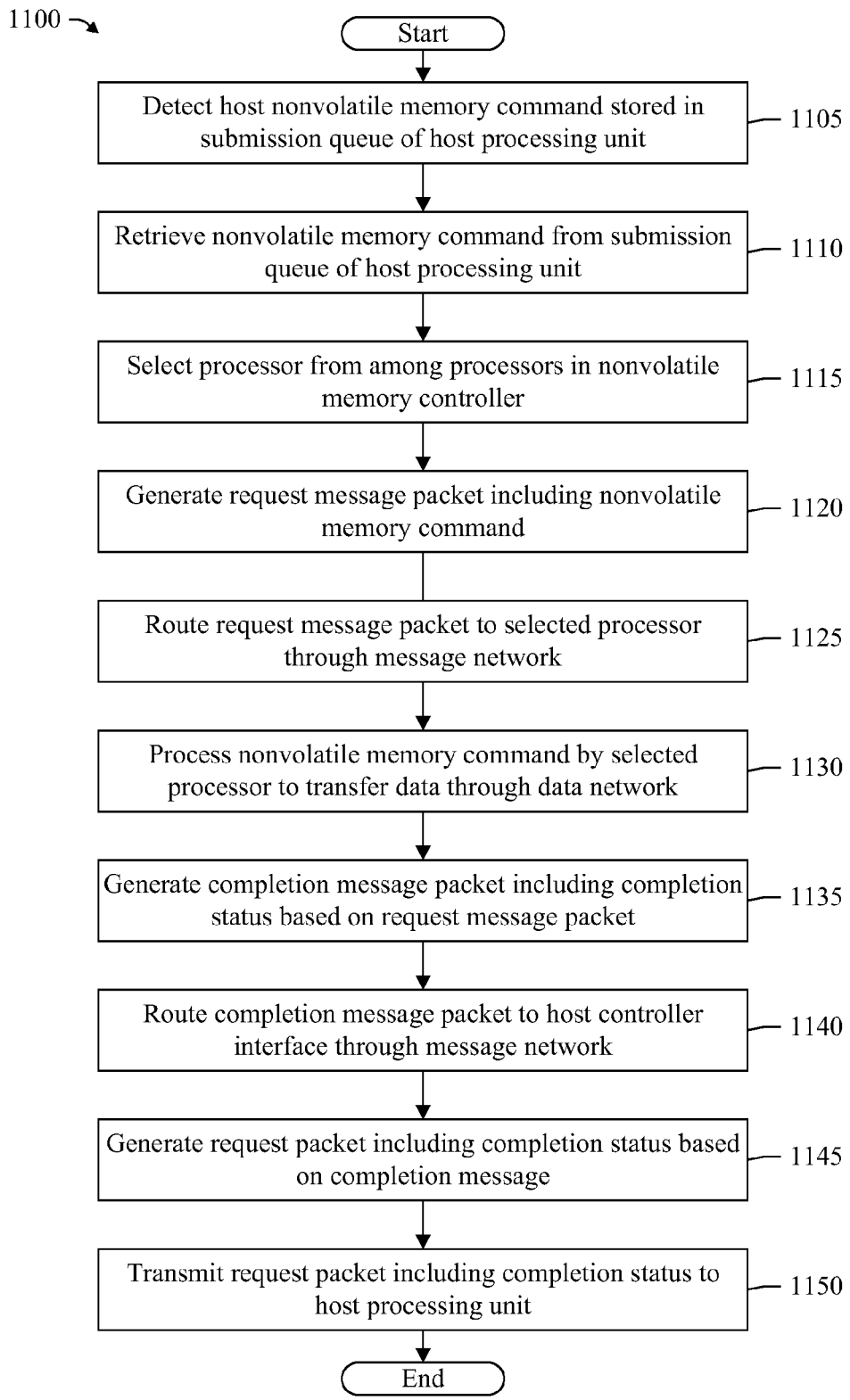
FIG. 11 is a flow chart for a method of managing a nonvolatile memory controller, in accordance with an embodiment of the present invention.

FIG. 11 illustrates a method 1100 of managing a nonvolatile memory controller, in accordance with an embodiment of the present invention. In step 1105, a nonvolatile memory command stored in a submission queue of a host processing unit is detected. In various embodiments, the host controller interface 120 of the nonvolatile memory controller 105 detects the nonvolatile memory command in a submission queue 520 of the host processing unit 110 based on both a submission queue head pointer 925 and a submission queue tail pointer 930 of the submission queue 520. The method 1100 then proceeds to step 1110.

In step 1110, a nonvolatile memory command is retrieved from the submission queue of the host processing unit. In various embodiments, the host controller interface 120 retrieves the nonvolatile memory command from the submission queue 520 of the host processing unit 110. For example, the host controller interface 120 may generate a request packet identifying the storage location 600 of the submission queue 520 storing the nonvolatile memory command, transmit the request packet to the host processing unit 110 through the communication network 115, and receive a completion packet containing the nonvolatile memory command from the host processing unit 110 through the communication network 115. In some embodiments, the host controller interface 120 may retrieve multiple commands from the host processing unit 110 through the communication network 115 in step 1110. The method 1100 then proceeds to step 1115.

In step 1115, a processor is selected from among processors in a nonvolatile memory controller. In various embodiments, the host controller interface 120 selects a processor 150 from among processors 150 in the processor module 145 of the nonvolatile memory controller 105. For example, the host controller interface 120 may select a processor 150 available to process the nonvolatile memory command from among the processors 150 in the processor module 145 based on a round robin selection algorithm. The method 1100 then proceeds to step 1120.

In step 1120, a request message packet including the nonvolatile memory command is generated. In various embodiments, the host controller interface 120 generates the request message packet including the nonvolatile memory command. In addition to the nonvolatile memory command, the request message packet includes an identifier identifying the selected processor 150. The method 1100 then proceeds to step 1125.

In step 1125, the request message packet is routed to the selected processor through a message network of the nonvolatile memory controller. In various embodiments, the message network 200 routes the request message packet to the selected processor 150 through the message network 200. For example, the host controller interface 120 may provide the request message packet to the message network 200, and the message network 200 may route the request message packet to the selected processor 150 based on the identifier of the selected processor 150 in the request message packet. The method 1100 then proceeds to step 1130.

In step 1130, the nonvolatile memory command in the request message packet is processed by the selected processor to transfer data through a data network in the nonvolatile memory controller. In various embodiments, the selected processor 150 processes the nonvolatile memory command in the request message packet to transfer data through the data network 205. For example, the selected processor 150 may process the nonvolatile memory command to transfer data between the host processing unit 110 and the nonvolatile memory device 140 through the data network 205.

In some embodiments, the selected processor 150 generates one or more request message packets, each of which includes a data transfer command, and provides each request message packet to the message network 200 for routing to a functional unit of the nonvolatile memory controller 105. In turn, each functional unit receiving a request message packet processes the data transfer command in the request message packet for performing a data transfer operation in the nonvolatile memory controller 105. In this way, the selected processor 150 processes the nonvolatile memory command in the request message packet received from the host controller interface 120 for transferring data between the host processing unit 110 and the nonvolatile memory device 140 though the data network 205 of the nonvolatile memory controller 105. The method 1100 then proceeds to step 1135.

In step 1135, a completion message packet including a completion status is generated based on the request message packet. In various embodiments, the selected processor 150 generates the completion message packet including the completion status based on the request message packet received by the selected processor 150. Moreover, the completion status corresponds to the nonvolatile memory command in the request message packet received by the selected processor 150. The completion status indicates a processing status of the nonvolatile memory command in the request message packet. For example, the completion status may indicate whether processing of the nonvolatile memory command by the selected processor 150 was a success or a failure. The method 1100 then proceeds to step 1140.

In step 1140, the completion message packet is routed to the host controller interface through the message network. In various embodiments, the message network 200 routes the completion message packet to the host controller interface 120 through the message network 200. For example, the selected processor 150 may provide the completion message packet to the message network 200. In turn, the message network 200 routes the completion message packet to the host controller interface 120. The method 1100 then proceeds to step 1145.

In step 1145, a request packet including the completion status is generated based on the completion message packet. In various embodiments, the host controller interface 120 generates the request packet including the completion status based on the completion message packet received by the host controller interface 120. For example, the request packet including the completion status may be a write request packet including a completion queue tail pointer 1030 identifying a storage location 700 of a completion queue 525 for storing the completion status. The method 1100 then proceeds to step 1150.

In step 1150, the request packet including the completion status is transmitted to the host processing unit. In various embodiments, the host controller interface 120 transmits the request packet including the completion status to the host processing unit 110 through the communication network 115. In turn, the host processing unit 110 processes the request packet by storing the completion status in the host processing unit 110. The method 1100 then ends.

In various embodiments, the method 1100 illustrated in FIG. 11 may include more or fewer than the steps 1105-1150 illustrated in FIG. 11 and described above. In some embodiments, the steps 1105-1150 of the method 1100 illustrated in FIG. 11 may be performed in a different order than the order illustrated in FIG. 11 and described above. In some embodiments, some of the steps 1105-1150 of the method 1100 illustrated in FIG. 11 may be performed in parallel or substantially simultaneously. In various embodiments, one or more of the steps 1105-1150 may be performed more than once in the method 1100 illustrated in FIG. 11. For example, step 1110 may be performed more than once before step 1115 is performed in the method 1100.

Figure 12:
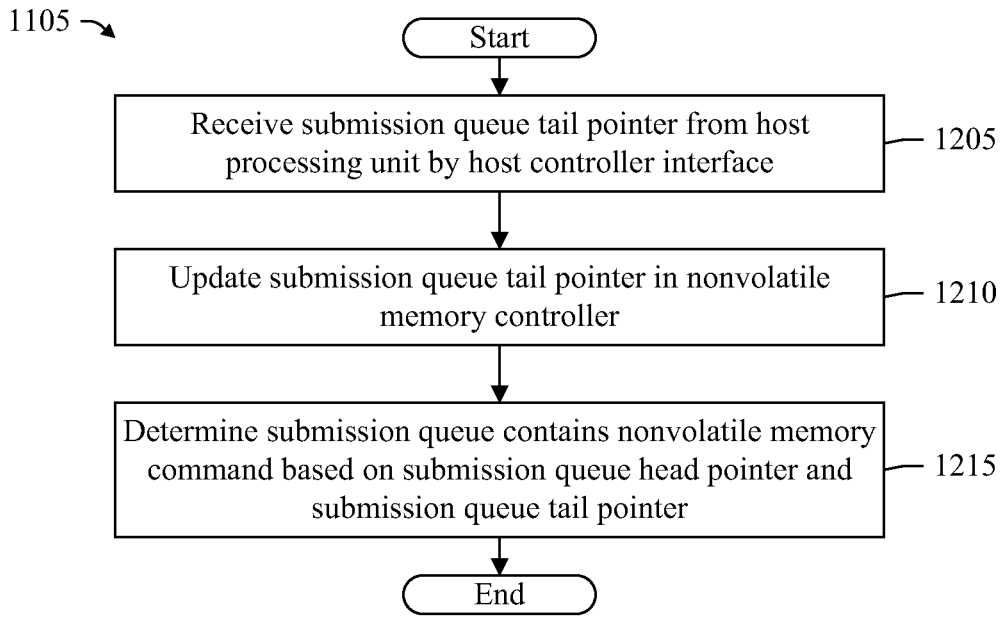
FIG. 12 is a flow chart for a portion of a method of managing a nonvolatile memory controller, in accordance with an embodiment of the present invention.

FIG. 12 illustrates a portion of the method 1100 of managing a nonvolatile memory controller, in accordance with an embodiment of the present invention. The portion of the method 1100 illustrated in FIG. 12 is an embodiment of the step 1105 of the method 1100 illustrated in FIG. 11. In step 1205, a submission queue tail pointer (e.g., an updated submission queue tail pointer) is received from the host processing unit by the nonvolatile memory controller. In various embodiments, the host controller interface 120 of the nonvolatile memory controller 105 receives a submission queue tail pointer 930. The portion of the method 1100 then proceeds to step 1210.

In step 1210, the submission queue tail pointer is updated in the nonvolatile memory controller. In various embodiments, the host controller interface 120 of the nonvolatile memory controller 105 updates the submission queue tail pointer 930 in the memory unit 920 of the host controller interface 120 with the submission queue tail pointer received by the nonvolatile memory controller 105 from the host processing unit 110. The portion of the method 1100 then proceeds to step 1215.

In step 1215, a determination is made whether the submission queue contains a nonvolatile memory command based on the submission queue head pointer and the submission queue tail pointer. In various embodiments, the host controller interface 120 determines whether the submission queue 520 contains a nonvolatile memory command based on the submission queue head pointer 925 and the submission queue tail pointer 930 of the submission queue 520. For example, the host controller interface 120 may determine that the submission queue 520 contains at least one nonvolatile memory command if the submission queue head pointer 925 and the submission queue tail pointer 930 identify different storage locations 600 in the submission queue 520. This portion of the method 1100 then ends.

In various embodiments, the portion of the method 1100 illustrated in FIG. 12 may include more or fewer than the steps 1205-1215 illustrated in FIG. 12 and described above. In some embodiments, the steps 1205-1215 of the portion of the method 1100 illustrated in FIG. 12 may be performed in a different order than the order illustrated in FIG. 12 and described above. In some embodiments, some of the steps 1205-1215 of the portion of the method 1100 illustrated in FIG. 12 may be performed in parallel or substantially simultaneously. In various embodiments, one or more of the steps 1205-1215 may be performed more than once in the portion of the method 1100 illustrated in FIG. 12.

Figure 13:
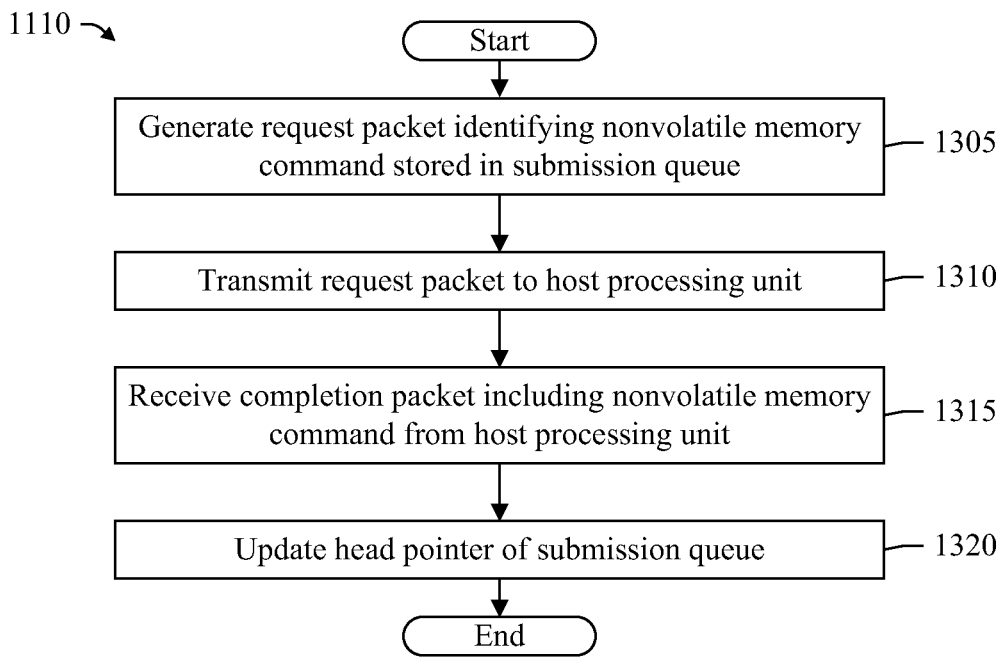
FIG. 13 is a flow chart for a portion of a method of managing a nonvolatile memory controller, in accordance with an embodiment of the present invention.

FIG. 13 illustrates a portion of the method 1100 of managing a nonvolatile memory controller, in accordance with an embodiment of the present invention. The portion of the method 1100 illustrated in FIG. 13 is an embodiment of the step 1110 of the method 1100 illustrated in FIG. 11. In step 1305, a request packet identifying the nonvolatile memory command stored in the submission queue is generated. In various embodiments, the host controller interface 120 generates the request packet identifying the nonvolatile memory command stored in the submission queue 520. The portion of the method 1100 then proceeds to step 1310.

In step 1310, the request packet is transmitted to the host processing unit. In various embodiments, the host controller interface 120 transmits the request packet to the host processing unit 110 through the communication network 115. The portion of the method 1100 then proceeds to step 1315.

In step 1315, a completion packet including the nonvolatile memory command is received from the host processing unit. In various embodiments, the host controller interface 120 receives the completion packet including the nonvolatile memory command from the host processing unit 110 through the communication network 115. The portion of the method 1100 then proceeds to step 1320.

In step 1320, the head pointer of the submission queue is updated. In various embodiments, the submission manager 800 updates the submission queue head pointer 925 associated with the submission queue 520 to identify the storage location 600 of the next nonvolatile memory command in the submission queue 520. For example, the submission manager 800 may increment the submission queue head pointer 925 stored in the memory unit 920 of the submission manager 800. This portion of the method 1100 then ends.

In various embodiments, the portion of the method 1100 illustrated in FIG. 13 may include more or fewer than the steps 1305-1320 illustrated in FIG. 13 and described above.

In some embodiments, the steps 1305-1320 of the portion of the method 1100 illustrated in FIG. 13 may be performed in a different order than the order illustrated in FIG. 13 and described above. In some embodiments, some of the steps 1305-1320 of the portion of the method 1100 illustrated in FIG. 13 may be performed in parallel or substantially simultaneously. In various embodiments, one or more of the steps 1305-1320 may be performed more than once in the portion of the method 1100 illustrated in FIG. 13.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A nonvolatile memory controller comprising:
a plurality of processors;
a host controller interface comprising:
 a command fetch module;
 a command dispatch module;
 a plurality of command assembly buffers coupled between the command fetch module and the command dispatch module;
 the command fetch module configured to detect a nonvolatile memory command stored in a host processing unit by monitoring a submission queue head pointer and a submission queue tail pointer stored in the nonvolatile memory controller, select a command assembly buffer of the plurality of command assembly buffers, retrieve the nonvolatile memory command from the host processing unit, write the nonvolatile memory command to the selected command assembly buffer, and update the submission queue head pointer to indicate that the host controller interface retrieved the nonvolatile memory command from the host processing unit; and
 the command dispatch module configured to determine the selected command assembly buffer contains the nonvolatile memory command without receiving the submission queue head pointer and the submission queue tail pointer from the command fetch module, select a processor of the plurality of processors, and generate a first request message packet identifying the nonvolatile memory command and the selected processor;
a data network coupled to the host controller interface; and
a message network coupled to the host controller interface and the plurality of processors, the message network configured to route the first request message packet to the selected processor, the selected processor configured to process the nonvolatile memory command for transferring data between the host processing unit and a nonvolatile memory device through the data network.

2. The nonvolatile memory controller of claim 1, wherein the host controller interface further comprises a plurality of message output queues coupled to the command dispatch module and the message network, the command dispatch module further configured to select a message output queue of the plurality of message output queues and write the first request message packet to the message output queue, the selected message output queue further configured to provide the first request message packet to the message network for routing to the selected processor.

3. The nonvolatile memory controller of claim 1, wherein the command fetch module is further configured to receive the submission queue tail pointer from a submission queue located in the host processing unit, store the submission queue tail pointer in the nonvolatile memory controller, store the updated submission queue head pointer in the nonvolatile memory controller, and detect the nonvolatile memory command stored in the submission queue based on both the submission queue head pointer and the submission queue tail pointer stored in the nonvolatile memory controller.

4. The nonvolatile memory controller of claim 1, wherein the selected processor is further configured to generate a first completion message packet including a completion status corresponding to the nonvolatile memory command, the message network is further configured to route the first completion message packet to the host controller interface, and the host controller interface is further configured to generate a write request packet including the completion status and transmit the write request packet to the host processing unit.

5. The nonvolatile memory controller of claim 4, wherein the host controller interface comprises:
a completion queue update module;
a plurality of message input queues, the selected processor further configured to select a message input queue of the plurality of message input queues for storing the first completion message packet; and
a completion queue engine coupled to the completion queue update module and the plurality of message input queues, the completion queue engine configured to read the first completion message packet from the selected message input queue and provide the first completion message packet to the completion queue update module, the completion queue update module configured to generate the write request packet and transmit the write request packet to the host processing unit.

6. The nonvolatile memory controller of claim 4, wherein the host controller interface is further configured to store both a completion queue head pointer and a completion tail pointer of a completion queue located in the host processing unit, and update the completion queue tail pointer to identify a storage location in the completion queue for storing the completion status.

7. The nonvolatile memory controller of claim 1, further comprising a controller memory and a storage controller both coupled to the message network, wherein the selected processor is further configured to generate a second request message packet and a third request message packet based on the nonvolatile memory command, the message network is further configured to route the second request message packet to the storage controller, the storage controller is further configured transfer the data from the nonvolatile memory device to the controller memory based on the second request message packet, the message network is further configured to route the third request message packet to the host controller interface, and the host controller interface is further configured to transfer the data from the controller memory to the host processing unit based on the third request message packet.

8. A nonvolatile memory controller comprising:
a processor module comprising a plurality of processors;
a host controller interface comprising:
 a plurality of message output queues;
 a command fetch module;
 a command dispatch module coupled to the plurality of message output queues;

a plurality of command assembly buffers coupled between the command fetch module and the command dispatch module;

the command fetch module configured to detect a nonvolatile memory command stored in a host processing unit by monitoring a submission queue head pointer and a submission queue tail pointer stored in the nonvolatile memory controller, select a command assembly buffer of the plurality of command assembly buffers, retrieve the nonvolatile memory command from the host processing unit, write the nonvolatile memory command to the selected command assembly buffer, update the submission queue head pointer to indicate that the host controller interface retrieved the nonvolatile memory command from the host processing unit; and the command dispatch module configured to determine the selected command assembly buffer contains the nonvolatile memory command without receiving the submission queue head pointer and the submission queue tail pointer from the command fetch module, select a message output queue of the plurality of message output queues, select a processor of the plurality of processors, generate a first request message packet identifying the nonvolatile memory command and the selected processor, and write the first request message packet to the selected message output queue;

a data network coupled to the host controller interface; and a message network coupled to the plurality of message output queues and the plurality of processors, the message network configured to route the first request message packet from the selected message output queue to the selected processor, the selected processor configured to process the nonvolatile memory command for transferring data between the host processing unit and a nonvolatile memory device through the data network.

9. The nonvolatile memory controller of claim 8, wherein the command fetch module is further configured to receive the submission queue tail pointer from a submission queue located in the host processing unit, store the submission queue tail pointer in the nonvolatile memory controller, store the updated submission queue head pointer in the nonvolatile memory controller, and detect the nonvolatile memory command stored in the submission queue based on both the submission queue head pointer and the submission queue tail pointer stored in the nonvolatile memory controller.

10. The nonvolatile memory controller of claim 8, wherein the selected processor is further configured to generate a first completion message packet including a completion status corresponding to the nonvolatile memory command, the message network is further configured to route the first completion message packet to the host controller interface, and the host controller interface is further configured to generate a write request packet including the completion status and transmit the write request packet to the host processing unit.

11. The nonvolatile memory controller of claim 10, wherein the host controller interface comprises:

a completion queue update module;

a plurality of message input queues, the selected processor further configured to select a message input queue of the plurality of message input queues for storing the first completion message packet; and a completion queue engine coupled to the completion queue update module and the plurality of message input queues, the completion queue engine configured to read the first completion message packet from the selected message input queue and provide the first completion message packet to the completion queue update module, the completion queue update module configured to generate the write request packet and transmit the write request packet to the host processing unit.

12. The nonvolatile memory controller of claim 10, wherein the host controller interface is further configured to store both a completion queue head pointer and a completion tail pointer of a completion queue located in the host processing unit, and update the completion queue tail pointer to identify a storage location in the completion queue for storing the completion status.

13. The nonvolatile memory controller of claim 8, further comprising a controller memory and a storage controller both coupled to the message network, wherein the selected processor is further configured to generate a second request message packet and a third request message packet based on the nonvolatile memory command, the message network is further configured to route the second request message packet to the storage controller, the storage controller is further configured transfer the data from the nonvolatile memory device to the controller memory based on the second request message packet, the message network is further configured to route the third request message packet to the host controller interface, and the host controller interface is further configured to transfer the data from the controller memory to the host processing unit based on the third request message packet.

14. A method comprising:

monitoring a submission queue head pointer and a submission queue tail pointer of a submission queue located in a nonvolatile memory controller to detect a nonvolatile memory command in a host processing unit by a host controller interface of the nonvolatile memory controller;

selecting a command assembly buffer from among a plurality of command assembly buffers in the host controller interface;

retrieving the nonvolatile memory command from the host processing unit by the host controller interface;

storing the nonvolatile memory command in the selected command assembly buffer;

updating the submission queue head pointer to indicate that the host controller interface retrieved the nonvolatile memory command from the host processing unit;

determining the selected command assembly buffer contains the nonvolatile memory command without using the submission queue head pointer and the submission queue tail pointer;

selecting a processor from a plurality of processors in the nonvolatile memory controller;

generating a first request message packet by the host controller interface, the first request message packet identifying the nonvolatile memory command and the selected processor;

selecting a message output queue of a plurality of message output queues in the host controller interface;

storing the first request message packet in the selected message output queue;

routing the first request message packet from the selected message output queue through a message network of the nonvolatile memory controller to the selected processor; and processing the nonvolatile memory command by the selected processor for transferring data between the host processing unit and a nonvolatile memory device through a data network of the nonvolatile memory controller.

15. The method of claim 14, further comprising:
receiving by the host controller interface the submission queue tail pointer of the submission queue.

16. The method of claim 14, further comprising:
generating a first completion message packet including a completion status corresponding to the nonvolatile memory command by the selected processor;
routing the first completion message packet through the message network to the host controller interface;
generating a write request packet including the completion status by the host controller interface; and
transmitting the write request packet to the host processing unit by the host controller interface.

17. The method of claim 16, further comprising:
storing in the host controller interface a completion queue head pointer of a completion queue located in the host processing unit;
storing in the host controller interface a completion queue tail pointer of the completion queue; and
updating the completion queue tail pointer by the host controller interface to identify a storage location in the completion queue for storing the completion status.

* * * * *